US010325165B2

(12) United States Patent
Wu et al.

(10) Patent No.: US 10,325,165 B2
(45) Date of Patent: Jun. 18, 2019

(54) VISION-BASED ON-STREET PARKED VEHICLE DETECTION VIA NORMALIZED-VIEW CLASSIFIERS AND TEMPORAL FILTERING

(71) Applicant: Conduent Business Services, LLC, Dallas, TX (US)

(72) Inventors: Wencheng Wu, Webster, NY (US); Hao Wu, Pittsford, NY (US); Yao Rong Wang, Webster, NY (US); Robert P. Loce, Webster, NY (US); Graham S. Pennington, Webster, NY (US)

(73) Assignee: Conduent Business Services, LLC, Dallas, TX (US)

( * ) Notice: Subject to any disclaimer, the term of this patent is extended or adjusted under 35 U.S.C. 154(b) by 224 days.

(21) Appl. No.: 14/502,045

(22) Filed: Sep. 30, 2014

(65) Prior Publication Data

US 2016/0093214 A1    Mar. 31, 2016

(51) Int. Cl.
*G06K 9/00*    (2006.01)
*G08G 1/14*    (2006.01)

(52) U.S. Cl.
CPC ......... *G06K 9/00812* (2013.01); *G08G 1/147* (2013.01)

(58) Field of Classification Search
CPC .... G06K 9/00812; G08G 1/145; G08G 1/146; G08G 1/147; G08G 1/148; G08G 1/149
USPC ........................................................ 348/148
See application file for complete search history.

(56) References Cited

U.S. PATENT DOCUMENTS

| | | | |
|---|---|---|---|
| 2012/0263346 A1* | 10/2012 | Datta ................... | G06K 9/4604 382/103 |
| 2014/0046874 A1 | 2/2014 | Li et al. | |
| 2014/0084789 A1* | 3/2014 | Schofield ............... | B60N 2/002 315/82 |
| 2014/0266803 A1 | 9/2014 | Bulan et al. | |
| 2015/0138001 A1* | 5/2015 | Davies ................... | G08G 1/149 340/932.2 |
| 2015/0371095 A1* | 12/2015 | Hartmann .......... | G06K 9/00791 348/148 |

OTHER PUBLICATIONS

Tomas Fabian, "An Algorithm for Parking Lot Occupation Detection", 7th Computer Information Systems and Industrial Management Applications, 2008.*

* cited by examiner

*Primary Examiner* — Ayman A Abaza
(74) *Attorney, Agent, or Firm* — Fay Sharpe LLP

(57) ABSTRACT

A system for estimating parking occupancy includes a vehicle-detection device including an adjustable mast supporting an image capture device at a select height. The image capture device acquires video of a current parking area. A computer processor in communication with the image capture device is configured to receive the video data and define a region of interest in the video data. The processor is further configured to perform a spatial transform on the ROI to transform the ROI to a normalized geometric space. The processor is further configured to apply features of a detected object in the normalized geometric space to a vehicle classifier—previously trained with samples acquired from a normalized camera perspective similar to the normalized geometric space—and determine the occupancy of the current parking area using an output of the classifier.

23 Claims, 13 Drawing Sheets

VISION-BASED ON-STREET PARKED VEHICLE DETECTION VIA NORMALIZED-VIEW CLASSIFIERS AND TEMPORAL FILTERING

BACKGROUND

The present disclosure teaches a camera-based system and method for estimating parking occupancy where the camera may be mounted on a mobile platform selectively deployable for temporary operation in a parking area for data collection. The disclosure contemplates use between multiple on-street parking environments, but is amendable to parking lots and other like environments.

One challenge that parking management companies face while managing parking operations is an accurate occupancy determination and future prediction capability about parking trends. Occupancy determination can be used, for example, for parking guidance, while occupancy prediction can be used to derive a dynamic pricing strategy for the managed parking area. This pricing strategy can require data on parking space usage patterns, which can also depend on the time of day, season, and/or scheduled events. To collect this occupancy data in a metered environment, some parking management companies use parking meter payment data as a surrogate of parking occupancy. The parking meter payment data can be insufficient because vehicles do not always park according to the exact time the meter is paid for, and some vehicles skip payment when they park at a meter that is still active after a previous vehicle departed.

The parking management company can alternatively monitor the parking spaces in the parking area. Existing methods for monitoring parking spaces and tracking vehicles occupying the spaces include sensor-based solutions. For example, "puck-style" sensors and ultrasonic ceiling or in-ground sensors output a binary signal when a vehicle is detected in the parking area. A disadvantage associated with these sensor-based methods is a high cost for installation and maintenance of the sensors. Therefore, camera monitoring systems were recently developed to detect and track vehicles by processing image frames acquired from a fixed video camera. Similar to the sensor-based solution, this technology was designed for permanent installation at the specific parking area being monitored. Therefore, an application of the occupancy data collected therefrom is limited to that specific parking area. Furthermore, a continuous collection of this data may not be necessary if the parking trends do not change over time. In this scenario, an installation of the monitoring system may not provide a substantial return on the investment.

A mobile parking occupancy estimation system and method is desired which is rapidly deployable for temporary operations between sites and is adapted to gather occupancy data from each specific site over a short period of time (e.g., a few days or week(s)). However, one foreseen challenge associated with a mobile system is that it would have to operate without receiving site-specific training for the specific parking area and/or configuration. One aspect of the existing camera monitoring system is that it typically acquires several days of video data to train a classifier used with the system. Unlike the existing stationary system, the mobile system cannot train a vehicle classifier using a constant background, as the background changes from site-to-site. The training can be considered necessary to maintain accuracy. However, where a system is desired to only temporarily collect data at the specific parking area, this site-specific training can be time consuming and exceed the duration that the mobile system is located at the site. In other words, the mobile system may not be provided the time necessary to ramp up to a suitable accuracy level for the specific parking area.

Because this disclosure anticipates a portable device that is moveable from site-to-site, each for a short period of time and possibly without returning, it becomes impractical for the site-specific training to work in this setting. Accordingly, a scalable system is desired which requires little to no site-specific training, re-training of classifiers, or parameter tuning, but one which still meets the desired accuracy levels. A selectively mobile system and method is desired which is operative to transform the different parking areas to a generally common view domain and train a classifier in the common view domain for improving accuracy.

INCORPORATION BY REFERENCE

The disclosures of co-pending and commonly assigned U.S. application Ser. No. 13/922,091, entitled, "A Method For Available Parking Distance Estimation Via Vehicle Side Detection", by Orhan Bulan, et al., filed Jun. 19, 2013; U.S. application Ser. No. 13/835,386, entitled "Two-Dimensional And Three-Dimensional Sliding Window-Based Methods And Systems For Detecting Vehicles", by Bulan et al., filed Mar. 15, 2013; U.S. patent application Ser. No. 13/913,606, entitled, "Precipitation Removal for Vision-Based Parking Management Systems", by Wencheng Wu, et al., filed Jun. 10, 2013; and US Publication No. 2014/0046874, entitled "Real Time Dynamic Vehicle Price Management Methods, Systems And Processor-Readable Media", by Faming Li, et al., filed Aug. 8, 2012 are each totally incorporated herein by reference.

BRIEF DESCRIPTION

One embodiment of the disclosure relates to a method for estimating parking occupancy in a current parking area. The method includes deploying an image capture device in the current parking area. The method includes defining a current region of interest (ROI) within a camera field of view of the current parking area. The method includes acquiring a sequence of frames captured by the image capture device. The method includes performing a spatial transform on the current ROI to transform the current ROI in the camera field of view to a normalized geometric space. The method includes detecting at least one object in the normalized geometric space. The method includes selecting a vehicle classifier previously trained with samples acquired from a normalized camera perspective similar to the normalized geometric space. The method includes determining occupancy of the current parking area by applying extracted features of the detected object to the classifier.

Another embodiment of the disclosure relates to a system for estimating parking occupancy. The system includes a computer device including a memory in communication with a processor configured to deploy an image capture device in the current parking area and define a current region of interest (ROI) within a camera field of view of the current parking area. The processor is further configured to acquire a sequence of frames captured by the image capture device. The processor performs a spatial transform on the current ROI to transform the current ROI in the camera field of view to a normalized geometric space and detect at least one object in the normalized geometric space. The processor further selects a vehicle classifier—previously trained with samples acquired from a normalized camera perspective similar to the normalized geometric space—and determines an occupancy of the current parking area by applying extracted features of the detected object to the classifier.

Another embodiment of the disclosure relates to a system for estimating parking occupancy. The system includes a vehicle-detection device including at least one image capture device for acquiring video of a current parking area and an adjustable mast supporting the at least one image capture device at a select height. The system further includes a computer processor in communication with the image capture device. The computer processor is configured to receive the video data and define a region of interest in the video data. The processor is further configured to perform a spatial transform on the ROI to transform the ROI to a normalized geometric space. The processor is further configured to apply features of a detected object in the normalized geometric space to a vehicle classifier—previously trained with samples acquired from a normalized camera perspective similar to the normalized geometric space—and determine the occupancy of the current parking area using an output of the classifier.

BRIEF DESCRIPTION OF THE DRAWINGS

FIG. 4A-8 is a flowchart describing a method for estimating parking occupancy using the occupancy determination unit of FIG. 2.

FIGS. 7A-8 shows an acquired image frame before and after a temporal filtering process is performed on it.

DETAILED DESCRIPTION

The present disclosure teaches a camera-based system and method for estimating parking occupancy using a mobile vehicle-detection device selectively deployable in a number of different parking areas. In other words, the vehicle-detection device is adapted to move site-to-site—i.e., rotate between different parking locations—to collect local parking occupancy information. Alternatively, the camera-based system may be used for parking occupancy detection in settings where the camera is mounted in a substantially stationary manner.

Figure 1:
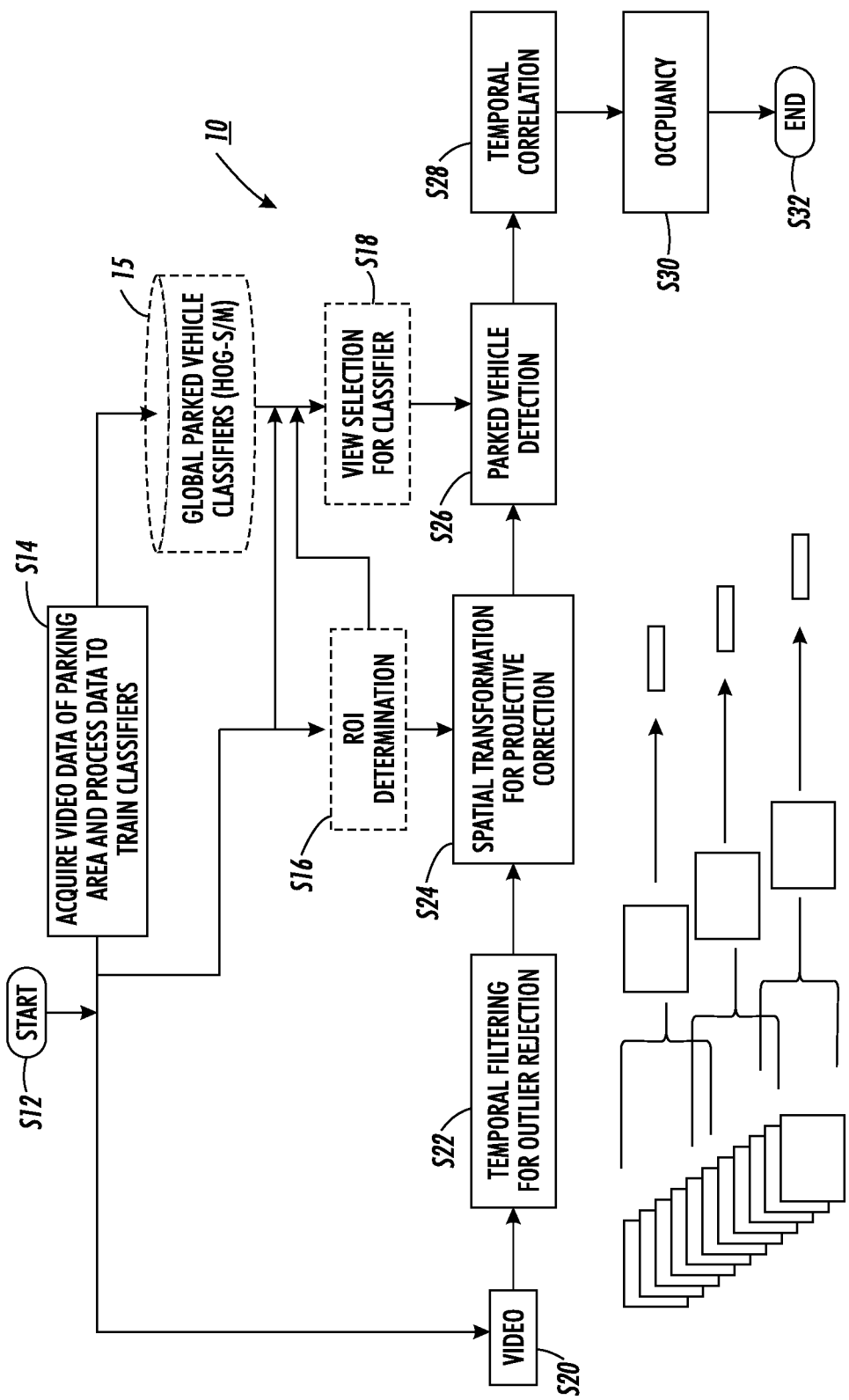
FIG. 1 is an overview of the present method.

FIG. 1 is an overview of a method 10 for estimating parking occupancy using the vehicle-detection device. The method starts at S12. At S14, the system acquires video data of at least one representative parking area and processes the data for training a set of global classifiers 15 via machine learning and view-normalization. In other words, training samples are collected from image frames captured at example parking areas and are view-normalized to at least one pre-determined geometric space (e.g., front-view or rear-view). The various classifiers for the at least-one pre-determined geometric space can each be trained using video frames captured from various heights and angles relative to the parking areas while keeping the general pose relative to the parked vehicles (e.g., front-view or rear-view) the same followed by a view-normalization to the at least-one pre-determined geometric space, and are thus trained using vehicles captured at a certain pre-determined geometric space.

When the vehicle-detection device, of the system, is positioned for deployment at a specific parking area of interest, a region of interest ("current ROI") is defined at S16 within the video camera field of view. Using the camera pose/orientation (i.e., front-view or rear-view relative to the parked vehicles at the parking area), one of the previously trained classifiers is selected from the set of available global classifiers at S18. Mainly, the selected classifier is one that was trained using vehicle samples extracted from image frames that were captured from a similar pose/orientation.

At the deployment stage, video data is acquired from the parking area-of-interest at S20. A temporal filtering analysis can be performed on the image frames to eliminate transient outliers at S22. Mainly, the temporal filtering can generate filtered image frames that essentially represent background and parked vehicle image segments. Next, a spatial transform is performed on the current ROI to transform the current ROI in the camera field of view to a normalized geometric space at S24. The spatial transform generates a projective correction on the filtered frames, and extracts segments of the frames corresponding to the normalized view of the current ROI. At S26, a camera-based stationary vehicle detection is performed on the transformed frames. In other words, the normalized geometric space is searched for at least one stationary object. Extracted features of the detected object are applied to the classifier selected at S18. As mentioned supra, this classifier was previously trained with samples acquired from a normalized geometric space. The results of the classifier provide the occupancy information of the current parking area. Optionally, a temporal correlation can be performed on the image content of the normalized views and/or the temporal occupancy information at S28. The results of the temporal correlation can be merged with the current occupancy information (generated at S26) to yield final occupancy information corresponding to the current ROI at S30. The collected parking occupancy information (and other information such as payment information) can then be used to derive an appropriate on-street parking pricing strategy for a parking management company. The method ends at S32.

Figure 2:
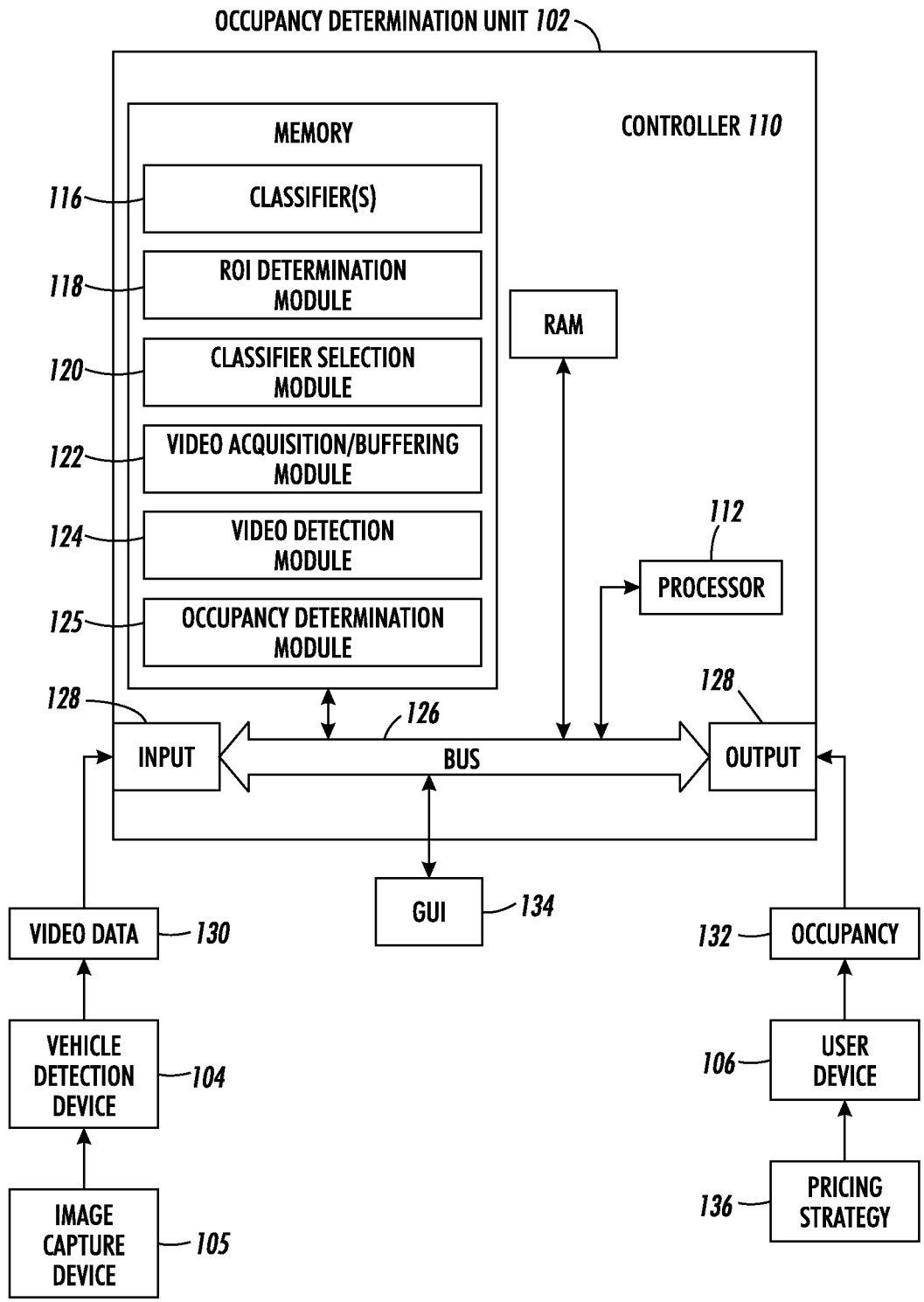
FIG. 2 is a schematic illustration of a camera-based system for estimating parking occupancy using information acquired from a vehicle-detection device.

FIG. 2 is a schematic illustration of a camera-based system 100 for estimating parking occupancy. The system 100 includes an occupancy determination unit 102 and a vehicle-detection device 104, which is selectively mobile, linked together by communication links, referred to herein as a network. In one embodiment, the system 100 may be in further communication with a user device 106. These components are described in greater detail below.

The occupancy determination unit 102 illustrated in FIG. 2 includes a controller 110 that is part of or associated with the occupancy determination unit 102. The exemplary controller 110 is adapted for controlling an analysis of video data received by the system 100. The controller 110 includes a processor 112, which controls the overall operation of the occupancy determination unit 102 by execution of processing instructions that are stored in memory 114 connected to the processor 112.

The memory 114 may represent any type of tangible computer readable medium such as random access memory (RAM), read only memory (ROM), magnetic disk or tape, optical disk, flash memory, or holographic memory. In one embodiment, the memory 114 comprises a combination of random access memory and read only memory. The digital processor 112 can be variously embodied, such as by a single-core processor, a dual-core processor (or more generally by a multiple-core processor), a digital processor and cooperating math coprocessor, a digital controller, or the like. The digital processor, in addition to controlling the operation of the occupancy determination unit 102, executes instructions stored in memory 114 for performing the parts of the method outlined in FIGS. 1 and 4A-B. In some embodiments, the processor 112 and memory 114 may be combined in a single chip.

The occupancy determination unit 102 may be embodied in a networked device, such as an image capture device 105 supported by the vehicle-detection device 104, although it is also contemplated that the occupancy determination unit 102 may be located elsewhere on a network to which the system 100 is connected, such as on a central server, a networked computer, or the like, or distributed throughout the network or otherwise accessible thereto. In other words, the processing can be performed within the image capture device 105 on site or in a central processing offline or server computer after transferring the video data through a network. In one embodiment, the image capture device 105 can be adapted to relay and/or transmit the video data to the occupancy determination unit 102. In another embodiment, the video data 130 may be input from any suitable source, such as a workstation, a database, a memory storage device, such as a disk, or the like.

The image capture device 105 is in communication with the controller 110 containing the processor 112 and memories 114.

The stages disclosed herein are performed by the processor 112 according to the instructions contained in the memory 114. In particular, the memory 114 stores a set of previously trained classifiers 116, each trained to determine vehicles and/or occupancy of the current parking area using extracted features of a detected object; a ROI determination module 118, which defines a ROI and determines a spatial transform that can be applied on the current ROI to transform the current ROI in the camera field of view to a normalized geometric space; a classifier selection module 120, which selects a vehicle classifier from the set being previously trained from a normalized camera perspective similar to the normalized geometric space; a video acquisition/buffering module 122, which acquires a sequence of frames captured by the image capture device included on the vehicle-detection device; a vehicle detection module 124 (i.e., a spatial and/or temporal transform module 124), which performs a temporal filtering analysis and a spatial transform on the sequence of frames to eliminate transient outliers and detects at least one object in the normalized geometric space; and, an occupancy determination module 125, which determines the occupancy information based on the results or further processed results of the vehicle detection module 124; and its results can be used, for example, to derive an appropriate on-street parking pricing strategy. Embodiments are contemplated wherein these instructions can be stored in a single module or as multiple modules embodied in different devices. The modules 116-125 will be later described with reference to the exemplary method.

The software modules as used herein, are intended to encompass any collection or set of instructions executable by the occupancy determination unit 102 or other digital system so as to configure the computer or other digital system to perform the task that is the intent of the software.

The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, internet-based programs stored on a remote server or so forth, source code, interpretive code, object code, directly executable code, and so forth. It is contemplated that the software may invoke system-level code or calls to other software residing on a server (not shown) or other location to perform certain functions. The various components of the occupancy determination unit 102 may be all connected by a bus 126.

With continued reference to FIG. 2, the occupancy determination unit 102 also includes one or more communication interfaces 128, such as network interfaces, for communicating with external devices. The communication interfaces 128 may include, for example, a modem, a router, a cable, and and/or Ethernet port, etc. The communication interfaces 128 are adapted to receive the video data 130 as input.

The occupancy determination unit 102 may include one or more special purpose or general purpose computing devices, such as a server computer, controller, or any other computing device capable of executing instructions for performing the exemplary method.

Figure 3:
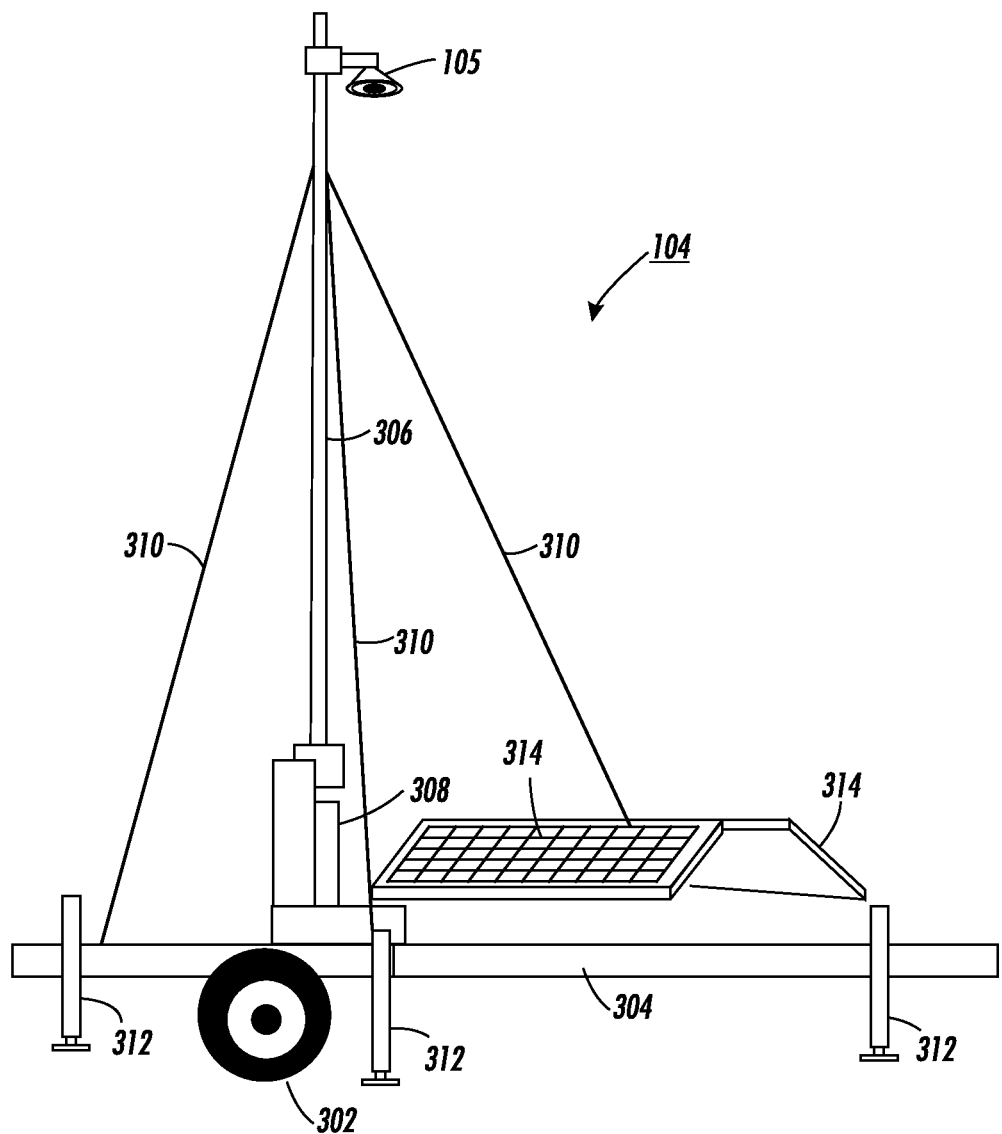
FIG. 3 is an example vehicle-detection device selectively deployable in a number of different parking areas.

FIG. 2 further illustrates the occupancy determination unit 102 connected to the vehicle-detection device 104 for capturing and/or providing the video (or image frame) data in electronic format. FIG. 3 is an example vehicle-detection device 104 adapted for temporary deployment in a select parking area. The vehicle-detection device 104 can be used on a mobile or stationary platform. Because the vehicle-detection device 104 is adapted to move from site-to-site, it is shown as a mobile, light-weight trailer; however, it can be integrated as a fixed pole, such as a camera attached to an existing light pole. In the illustrated embodiment, the trailer includes wheels 302 that can be pulled by another vehicle, but embodiments are contemplated which can include a framework 304 that is easily disassembled at a site location for transport without wheels. The vehicle-detection device 104 includes at least one image capture device 105 supported on a selectively adjustable mast 306. In the contemplated embodiment, at least two image capture devices are supported on the mast. By using multiple image capture devices, the vehicle-detection device 104 can establish a baseline parking occupancy pattern for a period of time. In response to the vehicle-detection device 104 being positioned at a desired site (for example, a street intersection), a first image capture device can capture a front view of inbound traffic relative to the first image capture device and a second image capture device can capture a rear view of outbound traffic relative to the image capture device. Detecting vehicles using multiple image capture devices can improve the efficiency of the data collection.

More specifically, a height and angle of the image capture device 105 can be fixed by adjusting the mast 306. In one embodiment, the mast 306 can include telescoping piping, which can be controlled using a mast pump 308. However, embodiments are contemplated where the mast 306 can be manually adjusted. Guide wires 310 can be used to stabilize mast 306 when it reaches a desired and proper position. Anchors or similar functioning stabilizers 312 can firmly anchor the vehicle-detection device 104 in place at the parking location.

In one embodiment, the vehicle-detection device 104 can include a power source for powering the mast. In the illustrative example, energy is gathered by the solar panels 314 and transferred to the mast pump 308.

Returning to FIG. 2, the image capture device 105 (hereinafter "video camera" 105) included on the mobile vehicle detection 104 may include one or more surveillance cameras that capture video from the parking area-of-interest. The number of cameras may vary depending on a length and location of the area being monitored. It is contemplated that the combined field of view of multiple cameras typically comprehends the entire area surrounding the parking area. For performing the method at night, the video camera 105 can include RGB or near infrared (NIR) capabilities coupled with an external illuminator. In one contemplated embodiment, the video camera 105 is a high resolution camera to enable the detection of stationary objects/vehicles.

With continued reference to FIG. 2, the video data 130 undergoes processing by the occupancy determination unit 102 to output occupancy data (such as, statistics) 132.

Furthermore, the system 100 can display the occupancy data and/or desired output in a suitable form on a graphic user interface (GUI) 134. The GUI 134 can include a display for displaying the information, to users, and a user input device, such as a keyboard or touch or writable screen, for receiving instructions as input, and/or a cursor control device, such as a mouse, touchpad, trackball, or the like, for communicating user input information and command selections to the processor 112. Alternatively, the occupancy determination unit 102 can provide the occupancy data to the output device 106, which can display pricing strategy to a user, such as a parking area management company. Furthermore, in one contemplated embodiment, the occupancy data can be transmitted to another computer application, which can perform additional processing on the image frames.

Figure 4A:
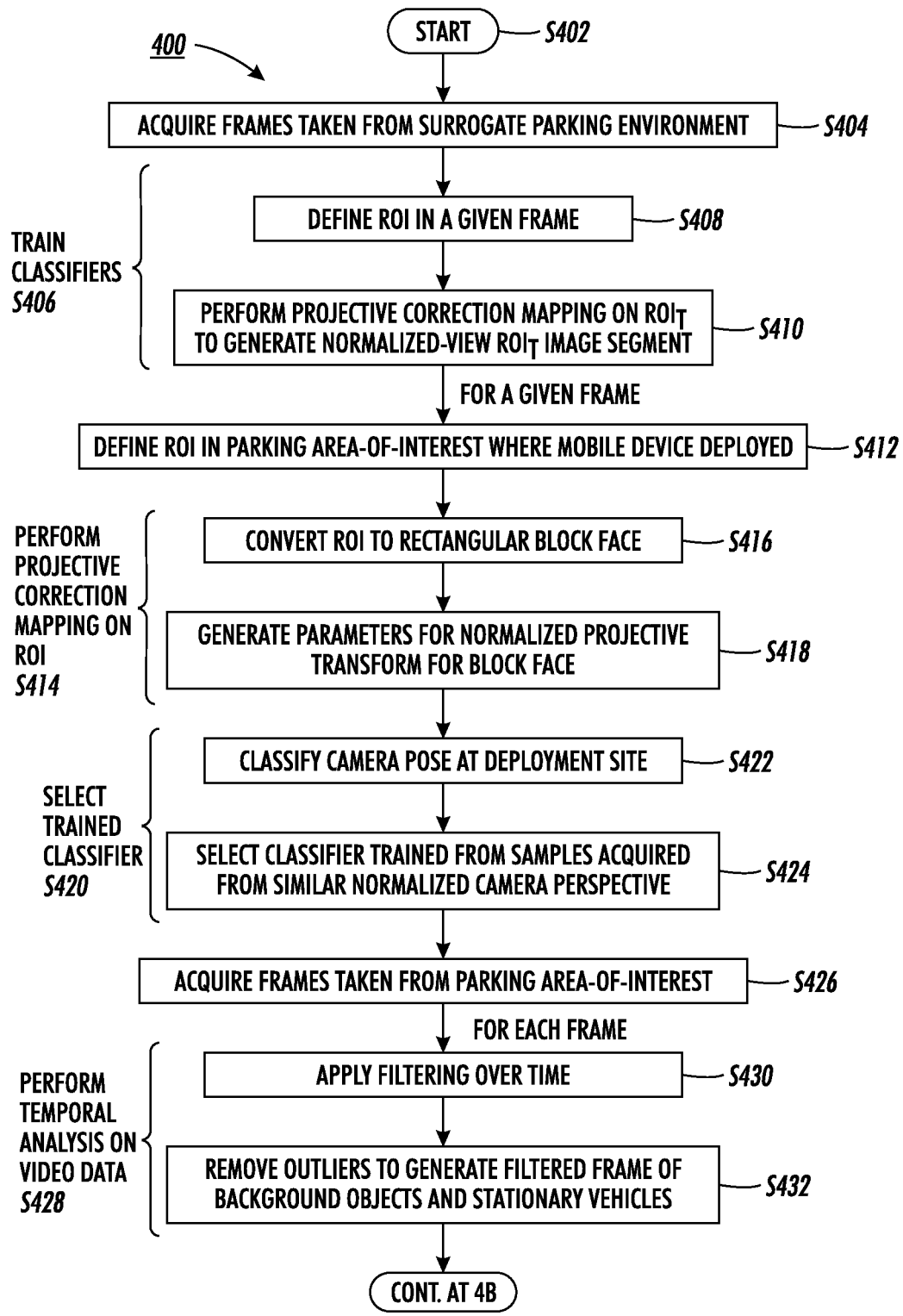
Figure 4B:
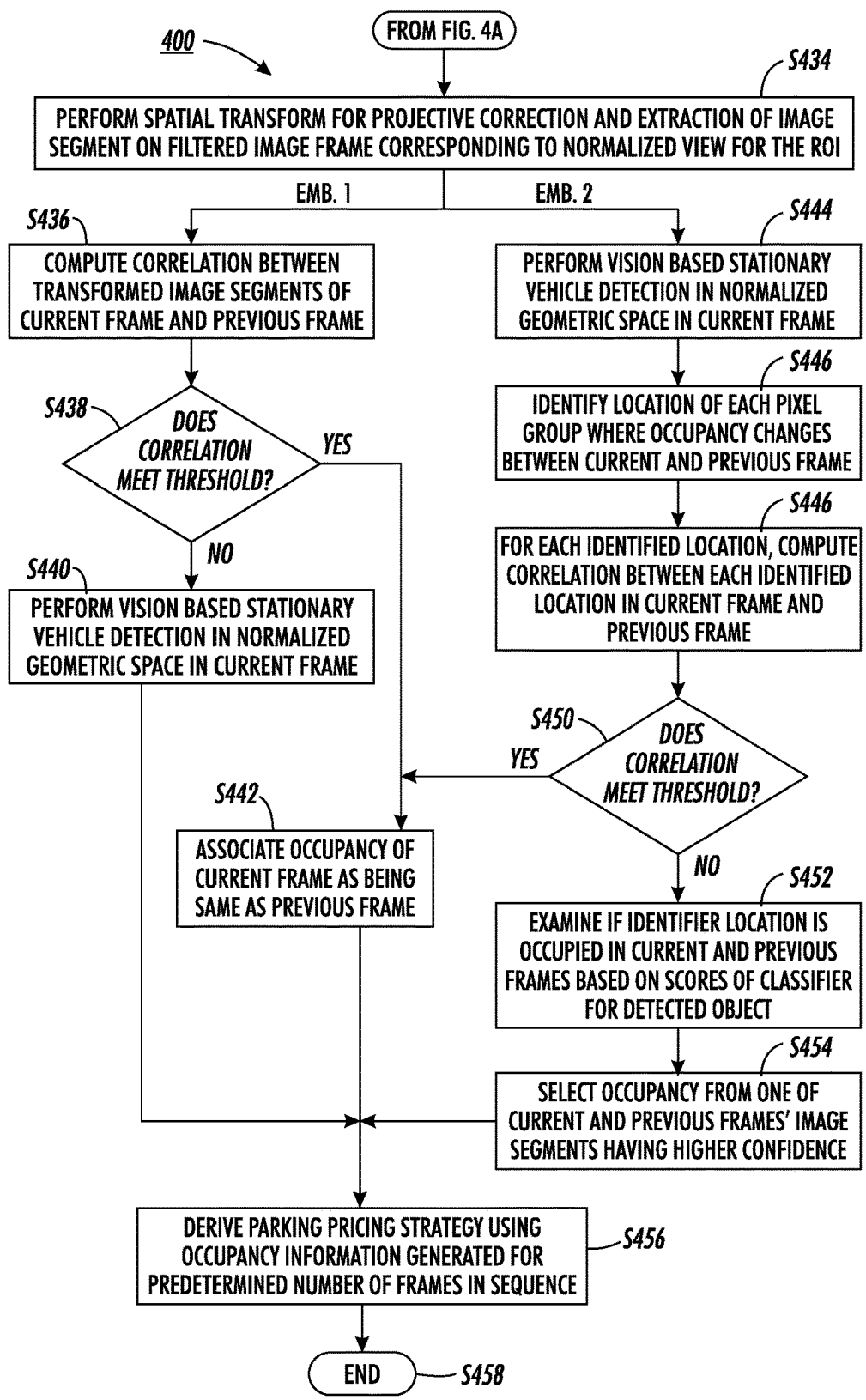

FIG. 4A-B is a flowchart describing a method 400 for determining parking occupancy using a selectively mobile vehicle-detection device and vision-based algorithms. The method starts at S402. During an off-line phase, multiple classifiers are trained at S404. Each classifier is trained by acquiring video of a representative parking scenario, which is acquired for training purposes. This step can be performed offline, and the training samples can be collected off-site—from sites other than the actual deployment sites—or on-site—from the deployment site. In other words, video can be captured in and acquired from any one of an off-site surrogate parking site, on-site at a future/desired parking site, and a previously monitored parking site. For example, the off-site surrogate parking site may include an on-street parking lane. The classifiers are referred to as "global" classifiers because the training samples can be collected from multiple sites; and the trained classifiers are intended to be used for stationary vehicles later detected and extracted from desired deployment sites that may or may not have been used for the training at S404.

Training samples are collected by acquiring image frames of the parking sites at S406. A training region of interest (ROI$_T$) is defined on the image plane of the acquired training video data at S408. The ROI$_T$ can be defined manually at the time the camera is installed in the selected training site. The ROI$_T$ is most likely quadrilateral in shape, particularly if it includes a parking lane along a street. However, for some embodiments, the image capture device 105 can have a viewing angle that is wide enough to yield images having curved lines that were straight in real-world coordinates. Therefore, the ROI$_T$ can also be defined by corner points, which can be connected by straight lines or arcs depending on the viewing angle of the image capture device.

Then, an automated algorithm is applied to the training ROI$_T$ to generate a projective correction mapping of the ROI$_T$ at S410. To derive the normalized projective transformation, the quadrilateral ROT$_T$ is converted into a parallelogram (such as, a "rectangular ROI$_T$") at its corner pixel coordinates, within which a width of a typical vehicle is fixed (such as, in one example, 70 pixel-wide). For the ROI$_T$ having curved lines or defining its shape, the four corners of the ROI$_T$ can be first selected and connected by arcs. The arcs can be defined by a third point connecting to corner points. With the ROI$_T$ and the current ROI being defined either by straight lines or curves, and geometric transform (mapping) can be performed on one or both such that they both represent the same viewing perspective.

Figure 5A:
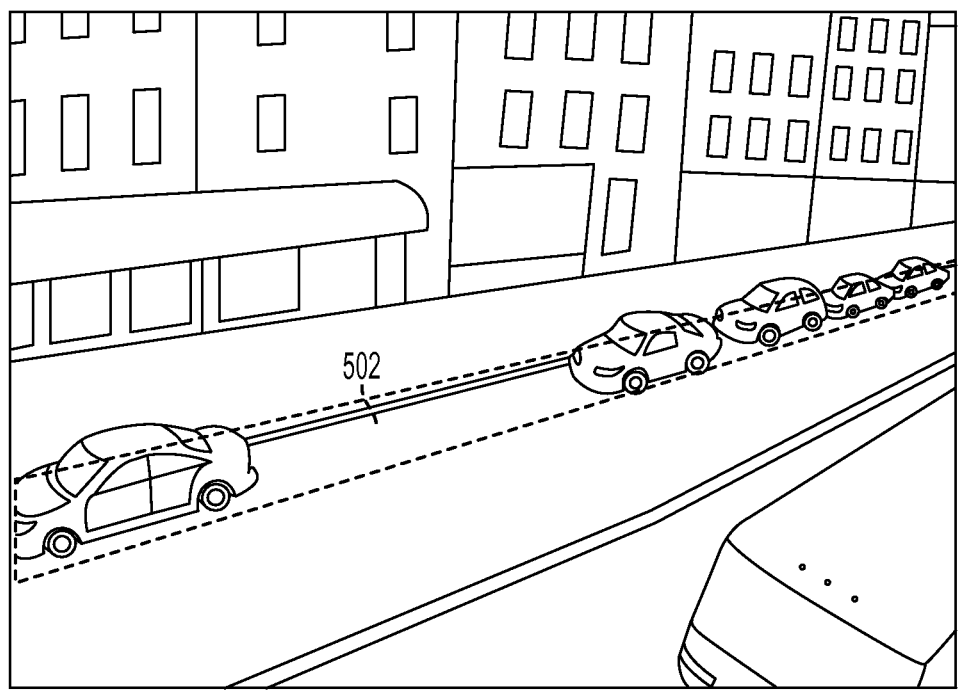
FIG. 5A-F illustrates sample input and output of the view-normalized training process.
Figure 5B:
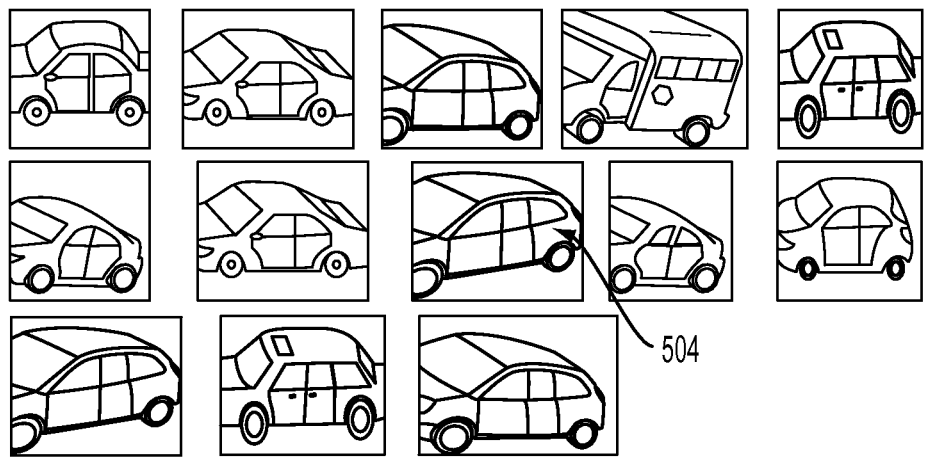
Figure 5C:
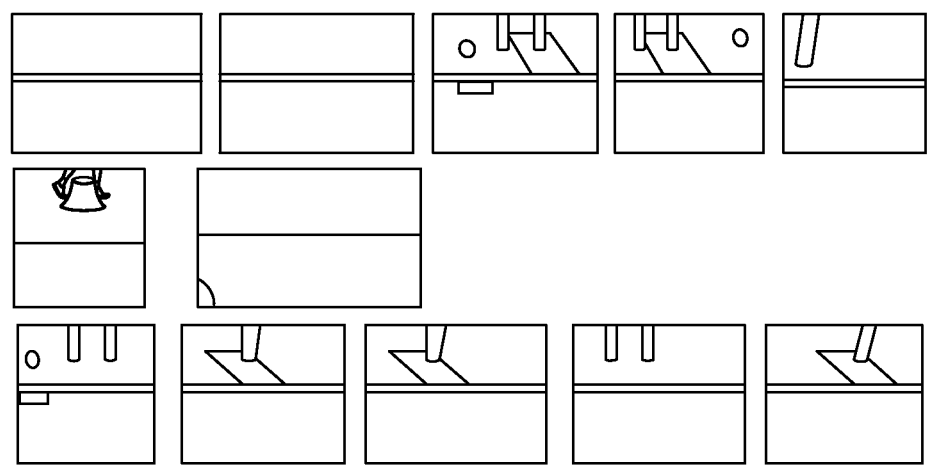
Figure 5D:
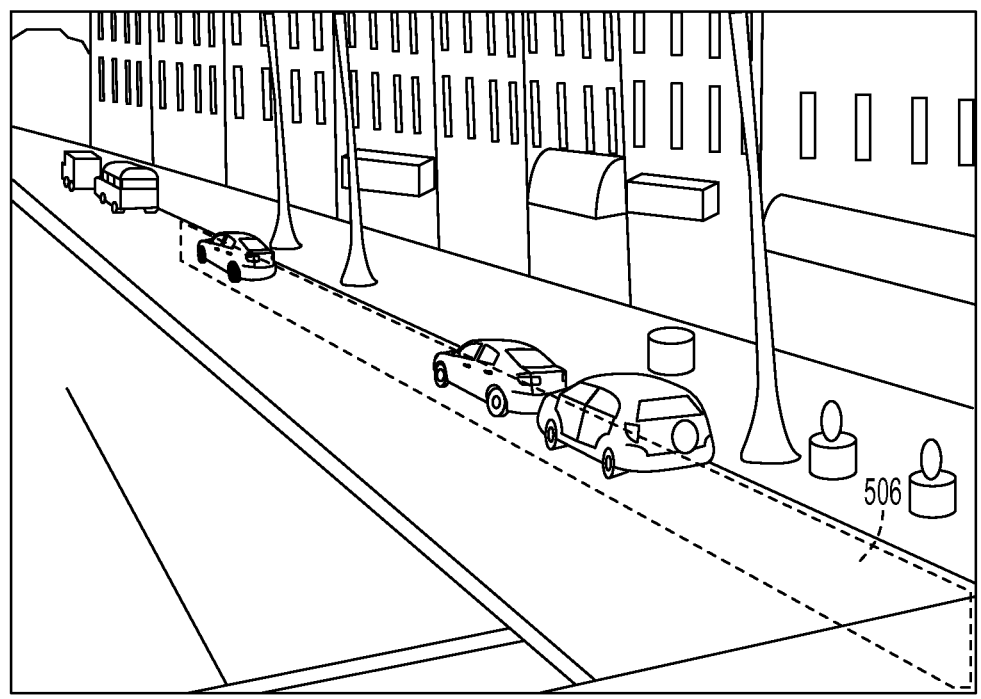
Figure 5E:
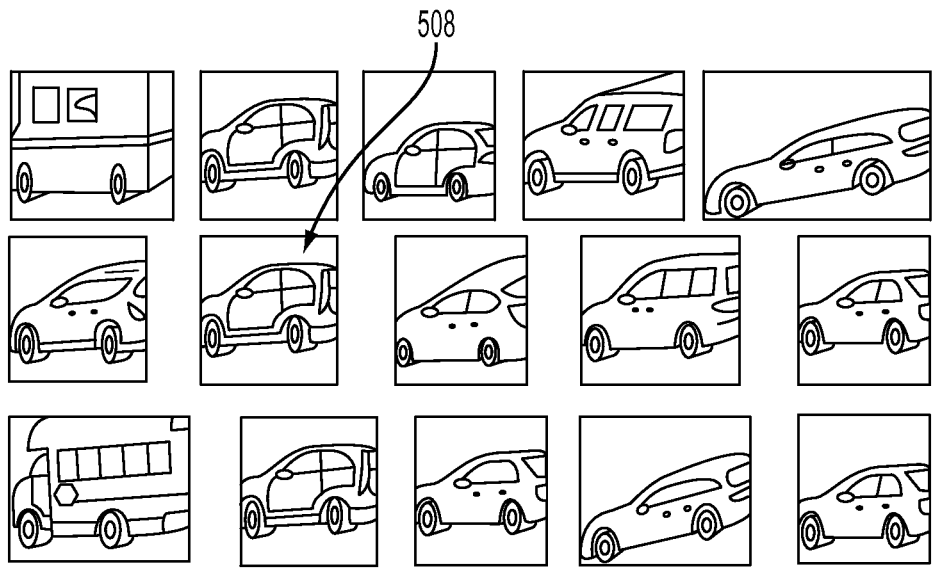
Figure 5F:
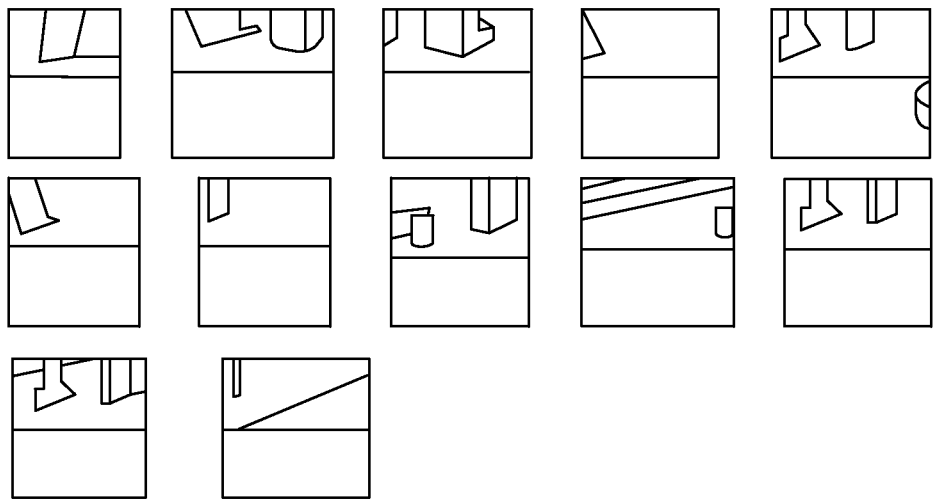

FIG. 5A-F illustrates sample input and output of the view-normalized training process. FIG. 5A shows an original front camera view of a sample parking site, which is an on-street parking lane 502. FIG. 5B shows a positive sample of a front-view of a stationary vehicle 504 (extracted from FIG. 5A) after the view normalization. As viewable between the illustrations of FIGS. 5A and 5B, the stationary vehicle 504 adjusted from having a quadrilateral orientation relative to the camera position in FIG. 5A to a rectangular orientation with a fixed width. FIG. 5C shows a negative sample (no vehicle) extracted from an image frame capturing the scene in FIG. 5A. Similarly, FIG. 5D shows an original rear camera view of a sample parking site, which is an on-street parking lane 506. FIG. 5E shows a positive sample of a rear-view of a stationary vehicle 508 (extracted from FIG. 5D) after the view normalization. As viewable between the illustrations of FIGS. 5D and 5E, the stationary vehicle 508 adjusted from having a quadrilateral orientation relative to the camera position in FIG. 5D to a rectangular orientation with a fixed width. FIG. 5E shows a negative sample (no vehicle) extracted from an image frame capturing the scene in FIG. 5D. The positive and negative samples can be manually labeled.

In brief, the normalized projective transformation attempts to make each ROI$_T$ appear as if it was acquired from the same camera perspective. Accordingly, after the normalized projective transformation, the vehicle 504 extracted from the forward-facing parking lane 502 in FIG. 5A appear as if it was acquired from the same perspective as the vehicles extracted from any other forward-facing parking lane with different angles shown in FIG. 5A and/or as the vehicle 508 extracted from the oppositely, oriented rear-facing parking lane 506 in FIG. 5D. The view-normalization process aims to reduce the number of views needed to train the classifiers.

In other embodiments, a classifier(s) can be trained using vehicle samples normalized to one view. In the contemplated embodiment, at least two classifiers can be trained each using samples from different views, such as the normalized front-view vehicle samples shown in FIG. 5B and the normalized rear-view vehicle samples shown in FIG. 5E. The multiple (e.g., two-) view approach enables vehicles extracted from various sites to be applied to a set of global classifiers without requiring on-site training of a classifier, and without incurring significant accuracy degradation.

In more detail, a set of global parked (stationary) vehicle classifiers are trained via machine learning and the view-normalization techniques. In one contemplated embodiment, a set of HOG-SVM classifiers can be trained using a histogram of oriented gradients (HOG) as the feature and support vector machine (SVM) as the machine learning method. HOG features have been shown to work effectively in vehicle detection applications; however, other combination of features (e.g., SIFT, SURF, LBP, GLOH etc.) and classifiers (e.g. LDA, Adaboost, Decision tree learning etc.) can be used for parked vehicle detection as well. For example, other types of classifiers that apply the features can include Neural Nets or Decision Trees can be used.

Figure 6A:
FIG. 6A-C illustrates a projective correction mapping procedure.
Figure 6B:
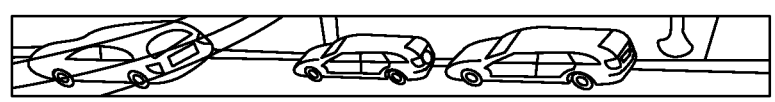
Figure 6C:
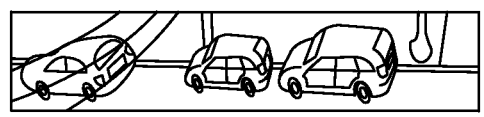

Returning to FIG. 4A, once the vehicle-detection device 104—similar to or similar in function to that shown in FIG. 3—is positioned at a given parking area-of-interest and the mast is adjusted to support the video camera(s) at a desired orientation, a ROI determination module 118 defines a region of interest within the parking area-of-interest as part of the camera calibration process at S412. The defined ROI decreases the region that is later searched for stationary vehicles and thereby decreases the search time and increases the accuracy of the computer application. The ROI can be defined manually at the time the mast is secured in position at the deployment site. For example, the ROI can be defined as four corners identified via the GUI 134 as user-input. The ROI is most likely defined to be quadrilateral in shape (see, for example, FIG. 6A), which enables a view normalization process to be performed on it. Then, an automated algorithm is applied to generate a projective correction mapping of the ROI at S414. To derive the normalized projective transformation, the ROI is converted into a parallelogram-shaped (e.g., rectangular shaped) ROI or block face (see, for example, FIG. 68) at its corner pixel coordinates at S416. Then, parameters for a normalized projective correction are automatically generated for the block face (see, for example, FIG. 6C) at S418 within which a width of a typical vehicle is fixed (such as, in one example, 70 pixel-wide). The projective correction can be performed manually or automatically off-line for the current site of deployment.

Returning to FIG. 4A, a classifier selection module 120 selects a trained classifier from among the set of pre-trained HOG-SVM classifiers at S420. As part of this selection process, the camera pose/orientation is classified relative to the current deployment site/parking-area-of-interest at S422. In the illustrative embodiment, the camera pose/orientation is classified as belonging to one of front- or rear-view perspective of the parking area-of-interest. For example, in the illustrative deployment site shown in FIG. 6A, the camera pose is classified as a rear-view pose because the vehicles are generally oriented away from the camera position. This classification can be performed off-line and can be provided manually as user-input at the time the system is being installed at the deployment site. Alternatively, this determination can be automated by the a classifier selection module 120, which can identify a direction of traffic flow in a lane that is next to the ROI using known video processing techniques.

The classifier selection module 120 then selects from among the set a classifier previously trained from samples acquired from a normalized camera perspective similar to the normalized geometric space at S424. For example, a front-view classifier—trained using samples similar to illustrative images shown in FIGS. 5B-C—is selected if the original image frames capture the in response to the camera pose being classified as a front-view pose and the rear-view classifier—trained using samples similar to illustrative images shown in FIGS. 5D-E—in response to the camera pose being classified as a rear-view pose. However, embodiments are contemplated which do not distinguish between front and rear views, but which use only one view or use multiple other perspective views.

Returning to FIG. 4A, the video buffering module 122 acquires video data by monitoring the parking area-of-interest at S426. Generally, the module acquires the video data from the image capture device 105, which is being supported on the vehicle-detection device 104 that is deployed on-site. The processing of this video data is now described for determining the occupancy of the parking area-of-interest over time.

The vehicle detection module 124 can perform a temporal filtering analysis on a sequence of acquired image frames to eliminate transient outliers at S428. Because the present disclosure aims to collect statistics and information regarding occupancy of stationary vehicles located in the parking area-of-interest, the method can omit processes directed toward a detection of objects in motion. Therefore, the temporal filtering can remove outliers, such as occlusion, that is due to adjacent traffic, and camera shake. One approach for removing outliers via temporal filtering is disclosed in co-pending and commonly assigned U.S. patent application Ser. No. 13/913,606, entitled, "Precipitation Removal for Vision-Based Parking Management Systems", by Wencheng Wu, et al., filed Jun. 10, 2013, which is totally incorporated herein by reference and which also discusses how temporal filtering improves the performance of vehicle detection.

In the illustrative embodiment, the module 124 applies a filtering over time at S430. A simple median filtering can be applied, although embodiments are contemplated as using other approaches, such as trim-mean filtering, approximate median filtering, Maximum Likelihood Estimation (MLE), and Hidden Markov Model (HMM) estimation, etc.

Figure 7A:
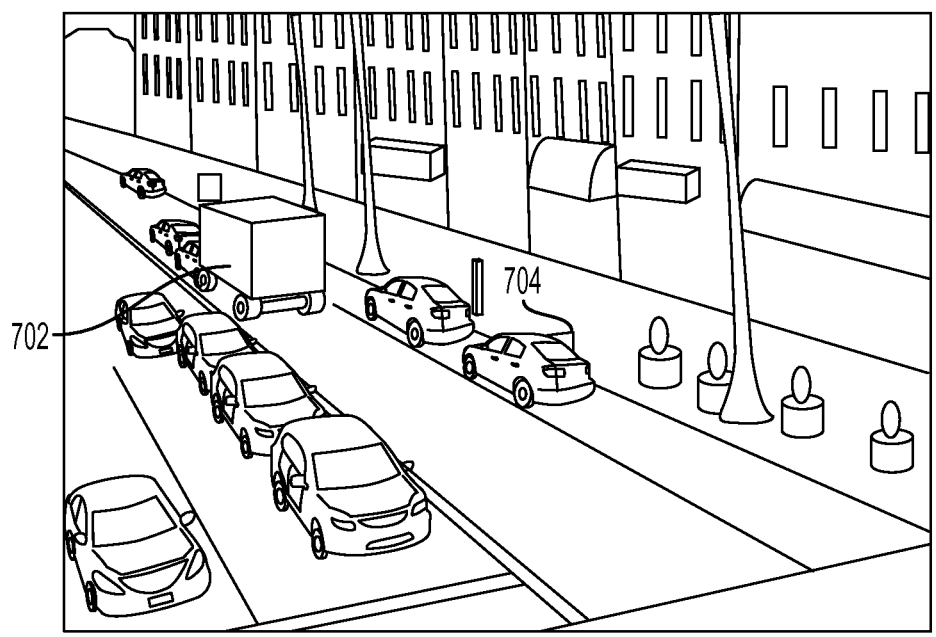
Figure 7B:
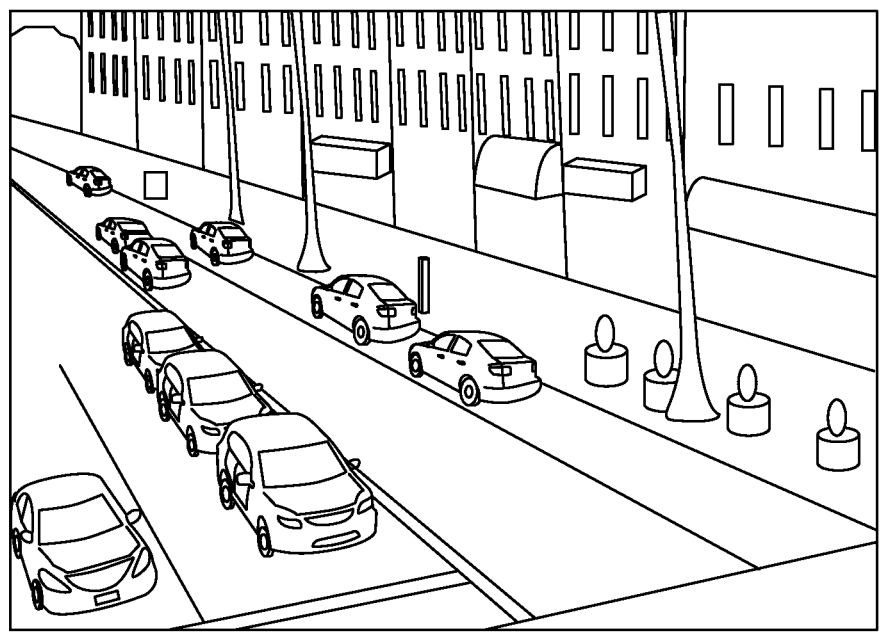

Outliers are then removed from the original image frame(s) to generate filtered image frames that essentially include stationary vehicle segments and background at S432. FIGS. 7A-B show an image frame before and after the temporal filtering is performed on it. FIG. 7A shows the original image frame. Transient information, such as moving commercial vehicle 702 and occlusion in the form of an open passenger vehicle door 704, is visible in FIG. 7A. After the temporal filtering operation, however, these transient objects are removed. FIG. 7B shows the filtered image frame with the outliers removed from the original frame. The removal of outliers enables the system to perform more robust vehicle detection in frames that originally include occlusion.

Figure 7C:
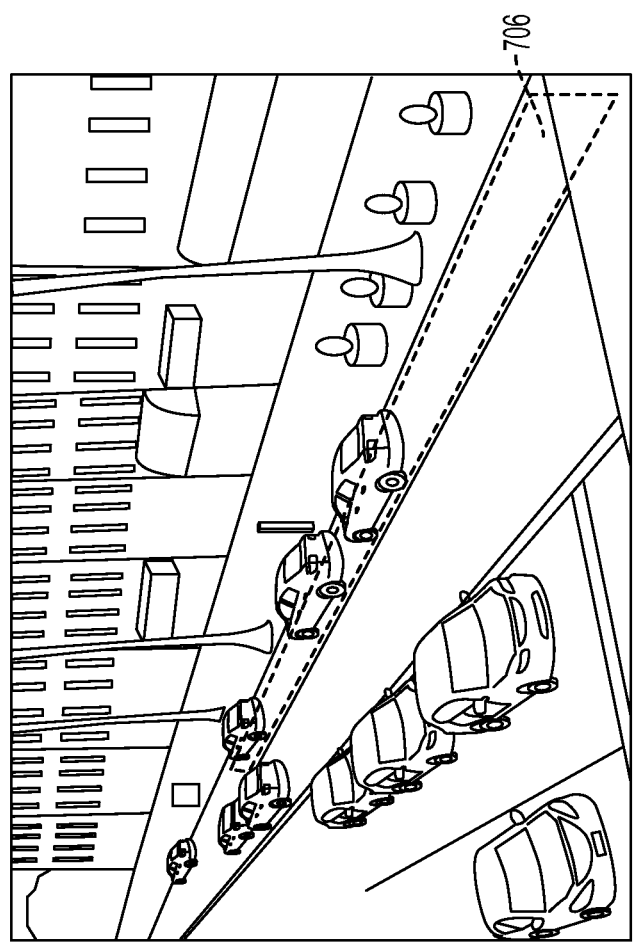
FIG. 7C shows a defined ROI segment virtually outlined in the given filtered image of FIG. 7B.
Figure 7D:
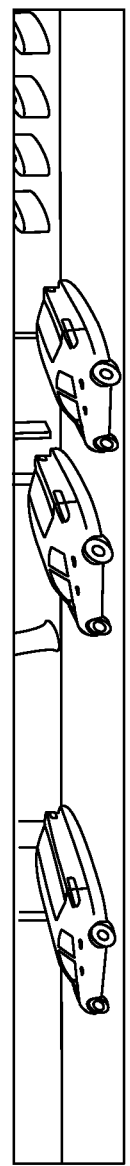
FIG. 7D shows a view-normalized ROI converting the ROI segment in FIG. 7C.

Continuing at FIG. 48, the module 124 can perform a spatial transform for projective correction and extraction of an image segment(s) on a filtered image frame corresponding to the normalized view of the ROI at S434. The projective correction mapping used on the given filtered image frame can be created when the ROI was defined at S412—when the system was installed and/or set-up at the deployment site. The normalized projective transformation similar to the operation described as part of the classification operation at S414-S418. FIG. 7C shows a defined ROI segment 706 virtually outlined in the given filtered image in FIG. 7B. FIG. 7D shows a view-normalized ROI (image segment) for the given (illustrative) image frame. The transformed image frame in FIG. 7D is shown in grayscale, however, color-version HOGs can be used if further discrimination is needed.

Returning to FIG. 48, in one embodiment the module 124 can optionally perform a temporal correlation on one of the transformed image content (EMB. 1) and the temporal occupancy information (EMB. 2), and fuse the results with current occupancy information to yield a final current occupancy of the ROI. The temporal correlation can improve an efficiency and accuracy of the vision-based parked vehicle detection.

In the first embodiment (EMB. 1), before searching the transformed image segment for at least one stationary object (i.e., vehicle), the module 124 can compute a correlation R between the transformed image segments/normalized ROIs of two temporally consecutive frames—i.e., a current image frame and that of a previous frame—at S436. The correlations can be compared to a predetermined threshold $\eta_1$ at S438. In one embodiment, the threshold can approximate $\eta_1$=0.995. In response to the correlation not exceeding the predetermined threshold (NO at S438), the vehicle detection module 124 performs vision-based stationary vehicle detection in the normalized geometric space for the at least one object in the current frame at S440. Example approaches for vision-based stationary vehicle detection are provided in the disclosures of co-pending and commonly assigned U.S. application Ser. No. 13/922,091, entitled, "A Method For Available Parking Distance Estimation Via Vehicle Side Detection", by Orhan Bulan, et al., filed Jun. 19, 2013 and U.S. application Ser. No. 13/835,386, entitled "Two-Dimensional And Three-Dimensional Sliding Window-Based Methods And Systems For Detecting Vehicles", by Bulan et al., filed Mar. 15, 2013, which are each totally incorporated herein by reference.

In response to the correlation meeting and exceeding the predetermined threshold (YES at S438), the module 124 can bypass the detection in the transformed image segment/normalized ROI for the at least one object in the current frame. Instead, the module 124 associates the occupancy of the current frame as being a same as the occupancy of the previous frame at S442. In other words, when the correlation is high the image content in the current normalized ROI stripe is almost the same as the image content in the previous frame. Therefore, the occupancy information should be the same, and there is no need for performing vision-based parked vehicle detection.

In the second embodiment (EMB. 2), the vehicle detection module 124 performs vision-based stationary vehicle detection in the normalized geometric space for the at least one object in the current frame at S444. The module 124 identifies a location of each pixel group where the occupancy changes between the current and a temporally consecutive previous frame at S446. For each identified location, a correlation $r_i$ is computed between the identified location in the current and previous frame at S448. The correlation can be compared to a predetermined threshold $\eta_2$, at S450. In one embodiment, the threshold can approximate $\eta_2$=0.95. In response to the correlation not exceeding the predetermined threshold (NO at S450), the vehicle detection module 124 retains the determined occupancy of the current frame and previous frames based solely on the detected object at S442. In response to the correlation meeting and exceeding the predetermined threshold (YES at S450), the module 124 examines if the identified location is occupied in the current frame and previous frames based on relative scores of the classifier for the detected object at S452. The module 124 uses the occupancy information with higher confidence (e.g., based on SVM-score) for that image segment at S454. In other words, for locations where the occupancy information rendered from the vision-based stationary vehicle detection process is inconsistent between temporally consecutive frames, but where the image content is almost the same between the frames, the system uses the output associated with higher confidence.

The occupancy determination module 125 can be used to derive an appropriate parking pricing strategy using the occupancy information at S456. One approach for deriving the on-street parking pricing strategy is disclosed in US Publication No. 2014/0046874, entitled "Real Time Dynamic Vehicle Price Management Methods, Systems And Processor-Readable Media", by Faming Li, et al., filed Aug. 8, 2012, and which is totally incorporated herein by reference. The method ends at S458.

By applying a set of global classifiers with normalized views, the present disclosure eliminates the time and cost associated with re-training classifiers for each site. The normalized view enables the vision-based stationary vehicle detection to be performed within a single search range for all deployment sites.

By applying a temporal filtering and correlation process to the video data, the present disclosure is more robust against occlusion, rain or snow, and camera shake, etc. The system requires no site-specific parameter tuning or re-training since the parameter values can be directly derived from and adjusted to other system requirements.

These aspects enable a more scalable system. The vehicle-detection device 104 can revisit the parking area-of-interest once the baseline parking pattern changes. The vehicle-detection device is more cost effective since because fewer units are needed—as one unit can be used at multiple locations—compared to the existing systems that install a fixed camera at each site location.

Although the control method 400 is illustrated and described above in the form of a series of acts or events, it will be appreciated that the various methods or processes of the present disclosure are not limited by the illustrated ordering of such acts or events. In this regard, except as specifically provided hereinafter, some acts or events may occur in different order and/or concurrently with other acts or events apart from those illustrated and described herein in accordance with the disclosure. For example, the order of which the temporal filtering and spatial transformation operations are performed on a given image frame can be interchangeable. In another example, the temporal correlation can be performed before or after vision-based stationary vehicle detection, depending on the particular algorithms. It is further noted that not all illustrated steps may be required to implement a process or method in accordance with the present disclosure, and one or more such acts may be combined. The illustrated methods and other methods of the disclosure may be implemented in hardware, software, or combinations thereof, in order to provide the control functionality described herein, and may be employed in any system including but not limited to the above illustrated system 100, wherein the disclosure is not limited to the specific applications and embodiments illustrated and described herein.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A computer-implemented method for estimating parking occupancy in a current parking area, the method comprising:
   at a server computer, executing instructions for:
   acquiring video data of the current parking area captured by an image capture device;
   segmenting a region of interest (ROI) within a current frame of the video data, the ROI being defined as a quadrilateral image segment of the parallel parking lane, wherein one or more stationary vehicles in the parallel parking lane are captured in a quadrilateral orientation relative to a camera field of view;

performing a temporal filtering analysis on the ROI, including:

normalizing the ROI by performing a spatial transform on the quadrilateral image segment, wherein the normalizing transforms the quadrilateral image segment in the image frame to a rectangular ROI of the parallel parking lane;

resizing the rectangular ROI of the parallel parking lane to generate a corrected block face of the parallel parking lane, the corrected block face having a fixed width, wherein any stationary vehicle in the corrected block face has a rectangular orientation relative to the image capture device such that forward or rear facing vehicles in the current frame appear in a same perspective in the corrected block face;

searching the corrected block face for one or more vehicles;

in response to detecting the one or more vehicles in the corrected block face, computing a correlation between the current frame and a previous frame;

comparing the correlation to a predetermined threshold; and, in response to the correlation meeting the predetermined threshold, associating a vehicle occupancy of the current frame as being a same as the previous frame.

2. The method of claim 1, further comprising performing a temporal filtering analysis on the video data to eliminate transient outliers.

3. The method of claim 1, wherein the performing the spatial transform on the quadrilateral image segment includes:

transforming a four sided polygon to a parallelogram.

4. The method of claim 1, further comprising:

before the detecting the one or more vehicles, computing the correlation between images in the corrected block face of the current frame and that of the previous frame;

comparing the correlation to the predetermined threshold;

in response to the correlation not exceeding the predetermined threshold, continuing to perform the detecting in the corrected block face for the one or more vehicles in the current frame; and, in response to the correlation exceeding the predetermined threshold, bypassing the detecting in the corrected block face for the one or more vehicles in the current frame and associating the vehicle occupancy of the current frame as being a same as the occupancy of the previous frame.

5. The method of claim 1, further comprising:

identifying a location of each pixel group where the occupancy changes between the current and previous frames;

for each identified location, computing the correlation between images of the identified location in the current and previous frames;

in response to the correlation not exceeding the predetermined threshold, retaining the vehicle occupancy of the current frame and previous frames based solely on the detected vehicle;

in response to the correlation exceeding a predetermined threshold, examining if the identified location is occupied in the current frame and previous frames based on relative scores of the classifier for the detected vehicle in the current frame and previous frames.

6. The method of claim 1, further comprising:

applying one of average, running average, weighted average, and median filtering to occupancy information in the current and previous frames; and, using the filtered result as the vehicle occupancy in the current frame.

7. The method of claim 1, wherein the performing the temporal filtering analysis includes:

applying a filtering over time; and, removing outliers from the video data to generate image frames of background objects and stationary vehicles.

8. The method of claim 1 further comprising:

applying the vehicle occupancy to a computer application to generate a demand model for managing the current parking area.

9. The method of claim 1 further comprising training a classifier, the training including:

deploying the image capture device for monitoring a representative parking area;

segmenting a representative ROI within a camera field of view of the representative parking area, the representative ROI being defined as a representative quadrilateral image segment; and, performing a geometric calibration on the representative quadrilateral image segment to transform the representative quadrilateral image segment in the camera field of view to a representative corrected rectangular block face within which a vehicle width is fixed at a predetermined number of pixels.

10. The method of claim 9, wherein the training the classifier further includes:

acquiring a sequence of frames captured by the image capture device;

detecting one or more stationary vehicles located in the representative corrected block face as vehicle samples; and, training at least one classifier using the vehicle samples.

11. The method of claim 1, wherein the corrected block face is selected from a group consisting:

a normalized front view of the current parking area;

a normalized rear view of the current parking area; and, a combination including both the normalized front and rear views;

and wherein the vehicle classifier is selected from a group consisting:

a front view classifier;

a rear view classifier; and at least two classifiers including front and rear view classifiers.

12. A system for estimating parking occupancy, the system comprising a computer device including a memory in communication with a processor configured to:

acquire video data of a current parking area captured by an image capture device;

segment a region of interest (ROI) within a current frame of the video data, the ROI being defined as a quadrilateral image segment of a parallel parking lane, wherein one or more stationary vehicles in the parallel parking lane are captured in a quadrilateral orientation relative to the image capture device;

normalize the ROI by performing a spatial transform on the quadrilateral image segment, wherein the normalizing transforms the quadrilateral image segment in the image frame to a rectangular ROI of the parallel parking lane;

resize the rectangular ROI of the parallel parking lane to generate a corrected block face of the parallel parking lane, the corrected block face having a fixed width, wherein any stationary vehicle in the corrected block face has a rectangular orientation relative to the image capture device such that forward or rear facing vehicles in the current frame appear in a same perspective in the corrected block face;

searching the corrected block face for one or more vehicles;

in response to detecting the one or more vehicles in the corrected block face, compute a correlation between the current frame and a previous frame;

compare the correlation to a predetermined threshold; and, in response to the correlation meeting the predetermined threshold, associate a vehicle occupancy of the current frame as being a same as the previous frame.

13. The system of claim 12, wherein the processor is configured to perform a temporal filtering analysis on the video data to eliminate transient outliers.

14. The system of claim 12, wherein the processor is configured to normalize the ROI by transforming a four sided polygon to a parallelogram.

15. The system of claim 12, wherein the processor is further configured to:

before the detecting the one or more vehicles, compute the correlation between images in the corrected block face of the current frame and that of a previous frame;

compare the correlation to the predetermined threshold;

in response to the correlation not exceeding the predetermined threshold, continue to perform the detecting in the corrected block face for the one or more vehicles in the current frame; and, in response to the correlation exceeding the predetermined threshold, bypass the detecting in the corrected block face for the one or more vehicles in the current frame and associate the occupancy of the current frame as being a same as the occupancy of the previous frame.

16. The system of claim 12, wherein the processor is configured to:

identify a location of each pixel group where the vehicle occupancy changes between the current and previous frames;

for each identified location, compute the correlation between images of the identified location in the current and previous frames;

in response to the correlation not exceeding the predetermined threshold, retain the vehicle occupancy of the current frame and previous frames based solely on the detected vehicle;

in response to the correlation exceeding a predetermined threshold, examine if the identified location is occupied in the current frame and previous frames based on relative scores of the classifier for the detected vehicle in the current frame and previous frames.

17. The system of claim 12, wherein the processor is configured to:

apply one of average, running average, weighted average, and median filtering to occupancy information in the current and previous frames; and, use the filtered result as the vehicle occupancy in the current frame.

18. The system of claim 12, wherein the processor is configured to:

apply a filtering over time; and, remove outliers from the video data to generate image frames of the background objects and stationary vehicles.

19. The system of claim 12, wherein the processor is configured to:

apply the vehicle occupancy to a computer application to generate a demand model for managing the current parking area.

20. The system of claim 12, wherein the processor is configured to:

before acquiring the video data of the current parking area, deploy the image capture device for monitoring a representative parking area, wherein the representative parking area can be a same as or different from the current parking area;

segment a representative ROI within a camera field of view of the representative parking area; and, perform a geometric calibration on the representative ROI to transform a representative quadrilateral image segment in the camera field of view to a representative corrected block face within which a vehicle width is fixed at a predetermined number of pixels.

21. The system of claim 20, wherein the processor is configured to:

acquire a sequence of frames captured by the image capture device;

detect one or more stationary vehicles located in the representative corrected block face as vehicle samples; and, train at least one classifier using the vehicle samples.

22. The system of claim 20, wherein the representative corrected block face is selected from a group consisting:

a normalized front view of the current parking area;

a normalized rear view of the current parking area; and, a combination including both the normalized front and rear views;

and wherein the vehicle classifier is selected from a group consisting:

a front view classifier;

a rear view classifier; and at least two classifiers including front and rear view classifiers.

23. A system for estimating parking occupancy, the system comprising:

a selectively mobile vehicle-detection device, the vehicle-detection device including:

at least one image capture device for acquiring video of a region of interest (ROI); and an adjustable mast supporting the at least one image capture device at a select height; and a computer processor in communication with the image capture device, the computer processor configured to:

acquire video data captured by the image capture device;

segment a region of interest (ROI) within a current frame of the video data, the ROI being defined as a quadrilateral image segment of the parallel parking lane, wherein one or more stationary vehicles in the parallel parking lane are captured in a quadrilateral orientation relative to a camera field of view;

perform a spatial transform on the ROI to generate a rectangular ROI of the parallel parking lane;

adjust the rectangular ROI to a corrected block face having a fixed width, wherein stationary vehicle in the corrected block face has a rectangular orientation relative to the image capture device;

in response to detecting one or more vehicles in the corrected block face, compute a correlation between the current frame and a previous frame;

compare the correlation to a predetermined threshold; and, in response to the correlation meeting the predetermined threshold, associate a vehicle occupancy of the current frame as being a same as the previous.

\* \* \* \* \*